(12) United States Patent
Ehrmann

(10) Patent No.: US 10,294,981 B2
(45) Date of Patent: May 21, 2019

(54) ADD-ON DRIVE SHAFT FOR AN ENCODER OR IMPELLER FAN AND METHOD FOR ADDING THE SHAFT

(71) Applicant: SIEMENS AKTIENGESELLSCHAFT, München (DE)

(72) Inventor: Michael Ehrmann, Tübingen (DE)

(73) Assignee: Siemens Aktiengesellschaft, München (DE)

( * ) Notice: Subject to any disclaimer, the term of this patent is extended or adjusted under 35 U.S.C. 154(b) by 446 days.

(21) Appl. No.: 14/858,586

(22) Filed: Sep. 18, 2015

(65) Prior Publication Data
US 2016/0084293 A1 Mar. 24, 2016

(30) Foreign Application Priority Data
Sep. 19, 2014 (EP) .................................. 14185605

(51) Int. Cl.
*F16C 3/02* (2006.01)
*F16D 1/027* (2006.01)
*H02K 7/00* (2006.01)
*H02K 11/21* (2016.01)
(Continued)

(52) U.S. Cl.
CPC .............. *F16C 3/02* (2013.01); *F16D 1/027* (2013.01); *F16D 1/068* (2013.01); *H02K 7/003* (2013.01); *H02K 11/21* (2016.01); *H02K 11/225* (2016.01); *F16D 2300/18* (2013.01); *Y10T 156/10* (2015.01); *Y10T 403/20* (2015.01); *Y10T 403/255* (2015.01); *Y10T 403/477* (2015.01); *Y10T 403/7037* (2015.01)

(58) Field of Classification Search
CPC . F16C 3/02; F16D 1/068; F16D 1/027; F16D 2300/18; H02K 11/225; H02K 7/003; H02K 11/21; Y10T 403/20; Y10T 403/255; Y10T 403/477; Y10T 403/7037; Y10T 156/10
USPC ............ 464/179, 182; 403/27, 37, 270, 360; 156/153, 293; 310/68 B, 75 R
See application file for complete search history.

(56) References Cited

U.S. PATENT DOCUMENTS 2,119,334 A    5/1938  Leffler
4,354,808 A *  10/1982 Ilg ..................... F04C 15/0076
                                                    403/360 X
(Continued)

FOREIGN PATENT DOCUMENTS

CN       1643266 A        7/2005
DE    202004015879 U1    12/2004
(Continued)

*Primary Examiner* — Greg Binda
(74) *Attorney, Agent, or Firm* — Henry M. Feiereisen LLC

(57) ABSTRACT

An add-on shaft for an electric motor, an electric motor having an add-on shaft, an add-on shaft that drives a rotary encoder and a method for connecting an add-on shaft to a motor shaft of an electric motor are disclosed. The add-on shaft has a pin that is introduced into a centered blind hole in the motor shaft of the electric motor. The pin has sections having different diameters, so that the add-on shaft is aligned coaxially with the motor shaft and fixed in the blind hole by an interference fit, but adhesive applied onto the pin is not wiped off during the joining operation. A defined adhesive gap optimal for the adhesive used is also provided.

10 Claims, 5 Drawing Sheets

(51) Int. Cl.
*H02K 11/225* (2016.01)
*F16D 1/068* (2006.01)

(56) References Cited

U.S. PATENT DOCUMENTS

| | | | |
|---|---|---|---|
| 6,291,914 B1* | 9/2001 | Mukaiyama | B62D 6/10 |
| | | | 310/68 B |
| 6,517,440 B2* | 2/2003 | Russell | B29C 45/14344 |
| | | | 464/179 X |
| 6,558,127 B2* | 5/2003 | Maruyama | H02K 11/21 |
| 8,672,548 B2* | 3/2014 | Hori | F16C 17/107 |
| 9,735,648 B2* | 8/2017 | Suzuki | H02K 11/225 |

FOREIGN PATENT DOCUMENTS

| | | |
|---|---|---|
| DE | 102005009601 A1 | 10/2006 |
| DE | 102008028657 A1 | 12/2009 |
| EP | 0232603 A1 | 8/1987 |
| EP | 0318618 A1 | 6/1989 |

* cited by examiner

_US 10,294,981 B2_

ADD-ON DRIVE SHAFT FOR AN ENCODER OR IMPELLER FAN AND METHOD FOR ADDING THE SHAFT

CROSS-REFERENCES TO RELATED APPLICATIONS

This application claims the priority of European Patent Application Serial No. 14185605.4, filed Sep. 19, 2014, pursuant to 35 U.S.C. 119(a)-(d), the content of which is incorporated herein by reference in its entirety as if fully set forth herein.

BACKGROUND OF THE INVENTION

The invention relates to an add-on shaft for an electric motor and method for connecting an add-on shaft to the drive shaft of an electric motor. In particular, the invention relates to an add-on shaft for driving a rotary encoder or impeller fan.

As is generally known, an electric motor converts electrical energy into mechanical energy. Most electric motors have a rotary shaft for this purpose. Machines, subassemblies or other devices driven by the electric motor can be coupled directly or indirectly to the motor's shaft.

Various embodiments of electric motors are well known—often referred to simply as motors, below. In particular, these embodiments include self-ventilated motors and force-ventilated motors and also motors fitted with a brake.

The rotational speed or position sensing provided by a rotary encoder can be used to control rotational speed and/or position, and combining a rotary encoder with an electric motor for that purpose is already known. The rotary encoder is coupled to the motor shaft and respective embodiments of the motor require motor shafts of different lengths. Coupling a fan impeller and/or a brake, for example, or coupling the rotary encoder, in any case, requires extending beyond the rotor/stator area of the motor, to enable them to be connected to the motor.

To avoid constructing different types of motors having motor shafts of different lengths, it is already known to extend it by using an add-on shaft on the side of the motor where the rotary encoder will be coupled to the motor. The add-on shaft is axially affixed to the motor shaft by introducing a pin provided for this purpose into a centered, blind hole drilled in the motor shaft and fixing that pin there, particularly by using an adhesive.

Hitherto, a problem with add-on shafts and also with their connection to the motor shaft, has been a less than optimum stability of the connection with the motor shaft in some instances, and the concentric position of the add-on shaft relative to motor shaft being sometimes less than fully satisfactory.

SUMMARY OF THE INVENTION

In accordance with the invention, an add-on shaft is provided that avoids or at least reduces the disadvantages described above. The present invention also provides an electric motor having such an add-on shaft, an add-on shaft for a rotary encoder and a method for connecting such an add-on shaft to the shaft of an electric motor.

In accordance with the invention, the add-on shaft has a plurality of sections that can be introduced, section by section, into a centered blind hole in a motor shaft of the electric motor, and can be fixed there. In particular can be fixed by adhesive means, the following is provided: The pin-like end of the add-on shaft which can be introduced into the blind hole comprises a plurality of cylindrical sections, or at least rotationally symmetric sections in respect of their envelope contour, which are chamfered where applicable. For differentiation purposes the individual successive sections are referred to—viewed from the free end—as first, second, third and fourth section. The diameters of the individual sections are referred to as first, second, third and fourth diameter corresponding to the numbering of the sections. With regard to the four different sections, the diameters of the second and fourth sections are equal in size. The second diameter therefore matches the fourth diameter. In contrast, the diameter of the third section of the add-on shaft situated between the second and fourth sections is less than the second or fourth diameter. The diameter of the first section is at least less than the second or fourth diameter, in particular equal in size to the diameter in the third section.

The advantage of the invention consists in the fact that the second and the fourth sections (having the greater diameter compared with the third section) are effective for fixing the add-on shaft in the blind hole. To this end the second and fourth diameters are chosen such that in the introduced state at least a light interference fit results with the blind hole in the motor shaft. The second and the fourth sections act in the blind hole as seats for the add-on shaft. In this situation the two sections (second and fourth sections) separated from one another by the third section produce a strictly axial alignment of the add-on shaft with the rotational axis of the motor shaft, in other words prevent any misalignment of the add-on shaft and ensure a high degree of concentricity. At least the third section having the smaller diameter in comparison with the laterally adjacent second and fourth sections comes into consideration as a location for the defined application of adhesive or the like where, on account of the laterally adjacent sections (second and fourth sections) having a greater diameter, applied adhesive is not wiped off when the add-on shaft is introduced into the blind hole. It is consequently ensured that adhesive is always situated on the surface of the third section during and after the introduction of the add-on shaft into the blind hole. The choice of a suitable difference between the diameter of the encompassing second and fourth sections and the diameter of the third section of the add-on shaft results in an adhesive gap width which can be optimized for the respective adhesive.

In an advantageous embodiment the first section of the add-on shaft is chamfered. The introduction of the add-on shaft into the blind hole is thereby facilitated.

In an embodiment of the add-on shaft the second and fourth cylindrical sections are produced with an interference fit in tolerance grade IT6 or finer and corresponding tolerance field (for example "m") by grinding or turning. Through the selection of a tolerance in the hole in the motor shaft of H7 or finer, a particularly accurate interference fit is achieved in this region. This improves the concentricity.

In a further or alternative embodiment of the add-on shaft the surface of the third cylindrical section, in particular the surface of the first cylindrical section and the surface of the third cylindrical section, is rougher than the surface of the second and fourth cylindrical sections. This can be achieved for example in that the surfaces of the second and fourth sections are ground and the surface of the third section or the surfaces of the first and third sections are turned. Particularly good wetting with adhesive and similarly particularly good adhesion of the adhesive are achieved as a result of the increased roughness of the surface of the third section or of the first and third sections. This improves the stability of the connection with the motor shaft.

In a further embodiment of the add-on shaft said embodiment has at least one in particular helical venting groove in the region from the first cylindrical section to the fourth cylindrical section. One or more venting grooves are formed in the surface of the pin, the part of the add-on shaft that can be introduced into the blind hole in the motor shaft and allows the air there to escape on introduction into the blind hole.

Taken as a whole the invention is also an electric motor having an add-on shaft of the type described here and in the following, in particular an electric motor with which a rotary encoder is associated, where a free end of such an add-on shaft acts as a drive shaft for the rotary encoder. In the embodiment of the electric motor in which a free end of the add-on shaft acts as a drive shaft for the rotary encoder the increased stability achieved of the joint between motor shaft and add-on shaft and also the increased concentricity achieved of the add-on shaft have a particularly favorable impact. On account of the increased stability of the joint, the coupling of the rotary encoder to the electric motor has a particularly high load capacity. On account of the increased concentricity, an increased accuracy of each measurement value obtainable from the rotary encoder results, in particular a measurement value relating to position or rotational speed. The drive provided by the electric motor then also comes into consideration for the attachment of functionally reliable rotary encoders. In this respect the invention is also the application of an add-on shaft of the type described here and in the following in a state connected to a motor shaft of an electric motor as a drive shaft of a rotary encoder associated with the electric motor.

The object mentioned in the introduction is also achieved by a method for connecting an add-on shaft of the type described here and in the following to a motor shaft of an electric motor. The method comprises the following steps: The surface of the add-on shaft is provided with an adhesive at least in the region of the third section, in particular in the region of the first to fourth sections. The add-on shaft is introduced, with the first section leading, into the blind hole in the motor shaft. In this situation the surface in the region of the second and fourth sections fixes the add-on shaft in the blind hole by means of an interference fit. The adhesive applied at least in the region of the third section, in particular in the region of the first to fourth sections or in the region of the first to fourth sections and also in the blind hole itself, cures in the interior of the blind hole and bonds the add-on shaft section by section with the interior surface of the blind hole.

The invention will be better understood when the detailed description of preferred embodiments provided below is read in conjunction with the figures provided, wherein.

In these drawings, items having similar structure have been assigned similar reference numerals.

DETAILED DESCRIPTION OF PREFERRED EMBODIMENTS

Figure 1:
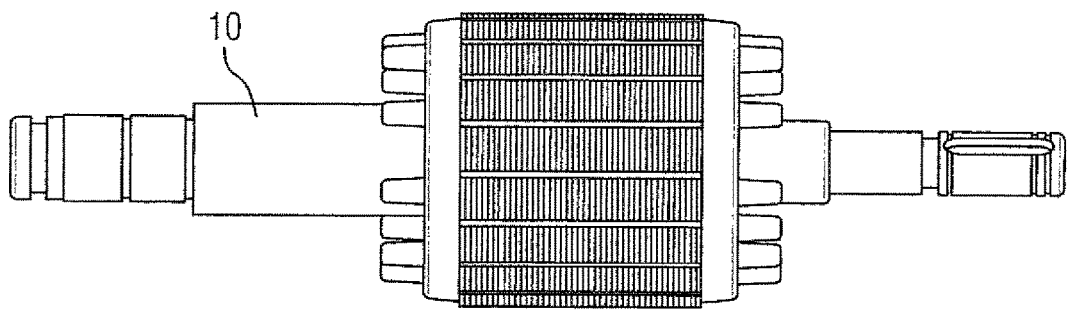
FIG. 1 shows a motor shaft/rotor of a conventional electric motor.
Figure 2:
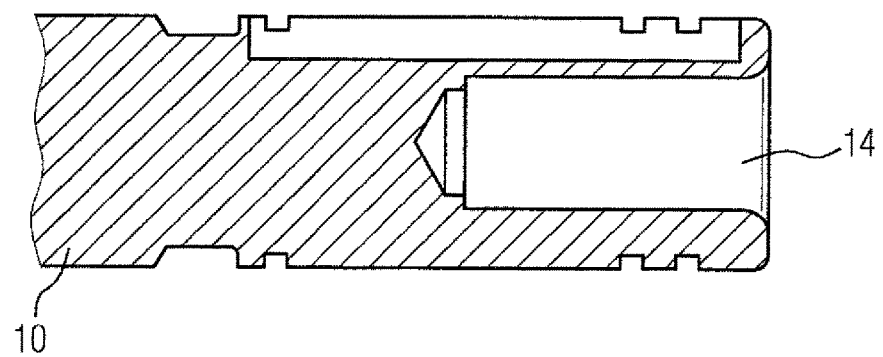
FIG. 2 is a partial sectional view of the rotor shown in FIG. 1.
Figure 3:
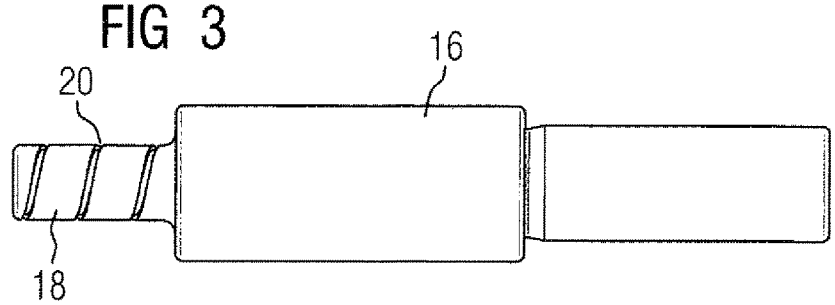
FIG. 3 is a first embodiment of add-on shafts in accordance with the invention.
Figure 4:
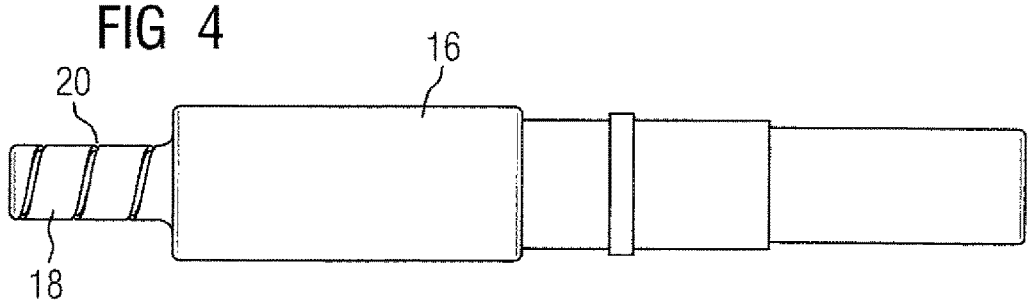
FIG. 4 is a first embodiment of a shaft in accordance with the invention.
Figure 5:
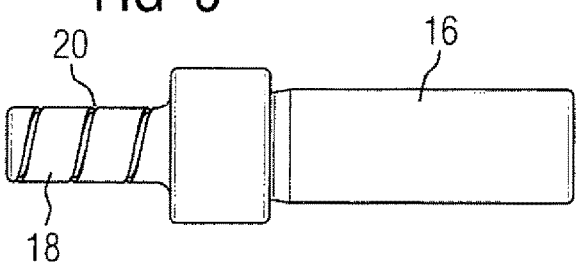
FIG. 5 is a second embodiment of a shaft in accordance with the invention.
Figure 6:
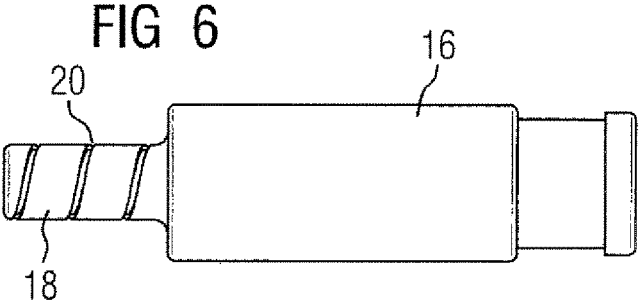
FIG. 6 is a third embodiment of a shaft in accordance with the invention.
Figure 7:
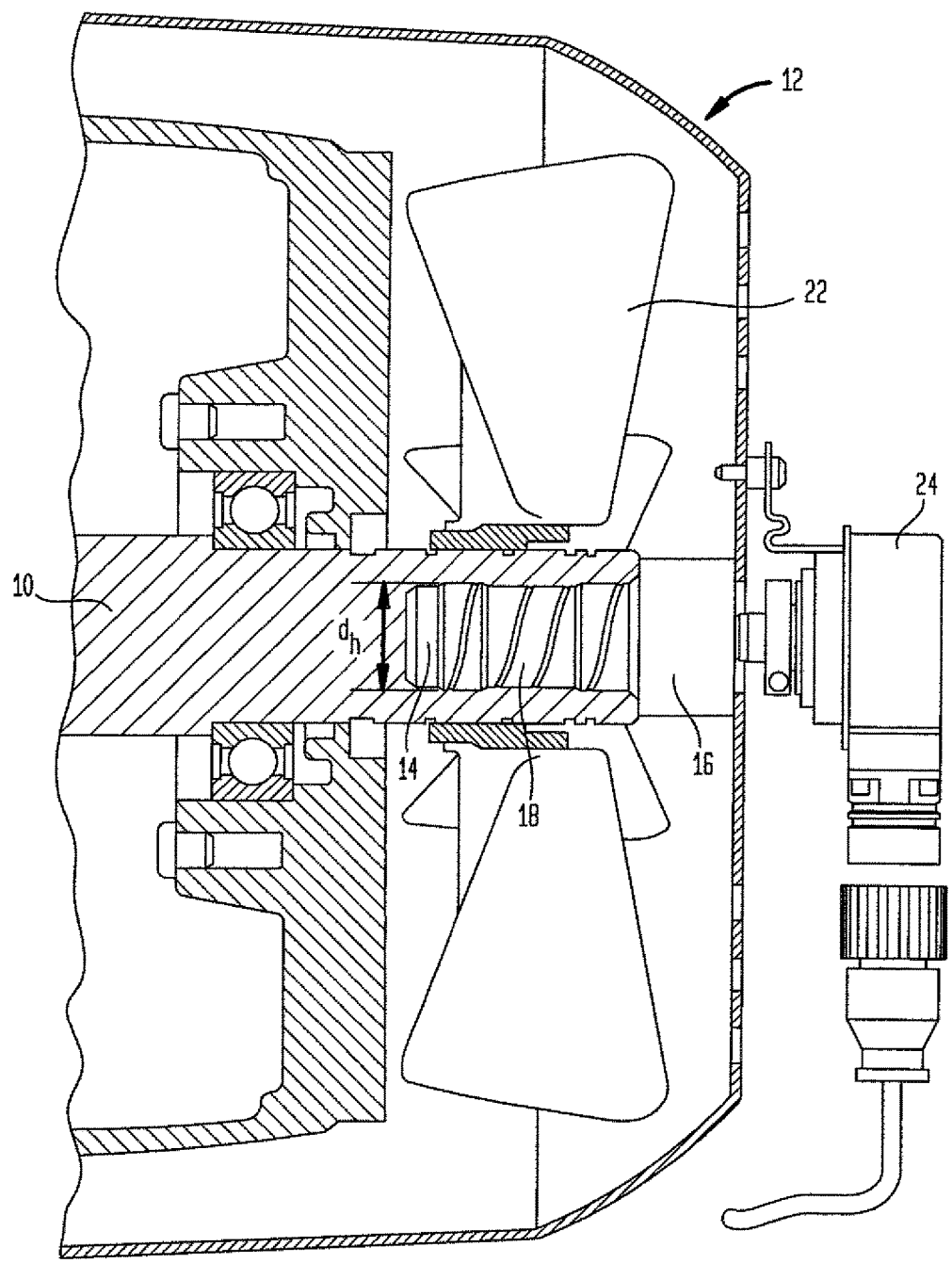
FIG. 7 is a cross section of part of an electric motor having an add-on drive shaft for a rotary encoder.
Figure 8:
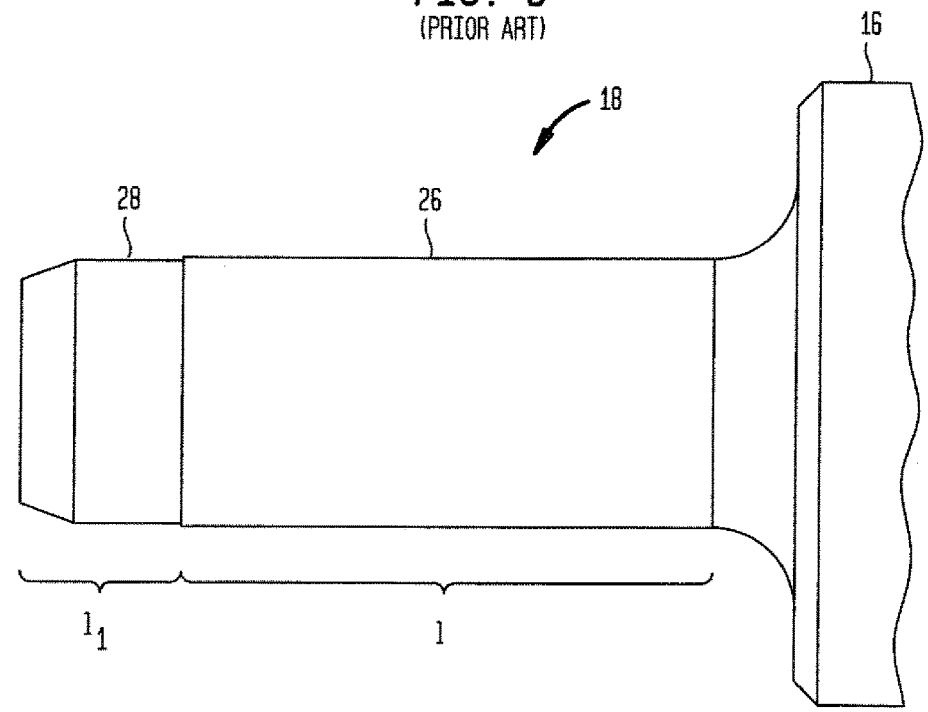
FIG. 8 shows the geometry of a pin in accordance with the prior art.

FIG. 1, FIG. 7, and FIG. 8 show a motor shaft 10 of a known rotor of an electric motor 12 that is shown in FIG. 7 but not illustrated elsewhere. FIG. 7 also shows an add-on shaft in accordance with the invention. In principle, the invention can be used to extend any type of shaft. Thus, whenever a particular motor shaft 10 is mentioned, the mention can also be understood to include other types of shafts. The motor shaft 10 in FIG. 1 has a centered blind hole 14 on the free end of the motor shaft 10, as is seen in the sectional view of that end in FIG. 2.

The different add-on drive shaft extensions 16 shown in FIG. 3 to FIG. 6 each have a centered pin 18 on one side that can be coupled to a motor shaft 10 of an electric motor 12 by introducing the pin 18 into the blind hole 14 in the end of the motor shaft 10. In order to enable air to escape from the blind hole 14 when the pin 8 is introduced into the blind hole 14, at least one venting groove 20 is provided in the surface of the pin 18.

The illustration in FIG. 7 shows a part of an already known electric motor 12. The motor shaft 10 and the add-on shaft 16 connected to the motor shaft 10 can be recognized. The connection of the add-on shaft 16 to the motor shaft 10 consists in the pin 18 of the add-on shaft 16 being introduced into the blind hole 14 of the motor shaft 10.

A fan impeller 22 is coupled to the motor shaft 10. The electric motor 12 in question illustrated by way of example is consequently a self-ventilated motor 12. A rotary encoder 24 is coupled to the free end of the add-on shaft 16. With reference to the illustrations in FIG. 3 to FIG. 6 it becomes clear that because of a wide variety of embodiments of the add-on shafts 16, in particular because of different lengths of such add-on shafts 16, the (indirect) coupling of a rotary encoder 24 to the motor shaft 10 is possible even in the case of different embodiments of the respective electric motor 12 and dimensions resulting therefrom. (with or without brake, with or without self-ventilation, with or without forced ventilation, etc.).

Figure 9:
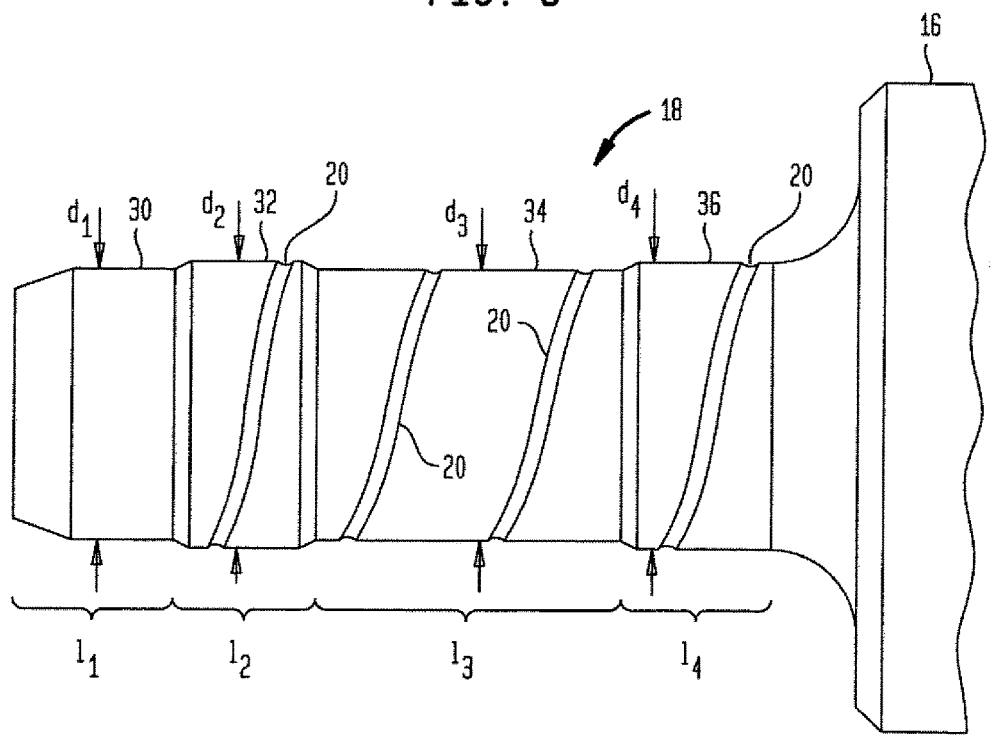
FIG. 9 shows the geometry of a pin in accordance with the invention.

The illustrations in FIG. 8 and FIG. 9 show the pin 18 ("add-on shaft pin") of the add-on shaft 16 with further details. The illustration in FIG. 8 shows an already known embodiment of the pin 18. The illustration in FIG. 9 shows an embodiment of the pin 18 according to the invention.

With regard to the known embodiment (FIG. 8), the pin 18 in question has a cylindrical section 26 having the length l with a j6 tolerance for example for a transition fit with the blind hole 14 with an H7 tolerance for example. The surface of the cylindrical section 26 is generally ground. Before the cylindrical section 26 there is also a chamfered, generally turned entry guide 28 having the length l1 with a slightly smaller diameter.

Adhesive for fixing the pin 18 in the blind hole 14 and thus for fixing the add-on shaft 16 to the motor shaft 10 is applied to the surfaces of the cylindrical sections 26, 28. An often helical venting groove 20, not shown here (see FIG. 3 to FIG. 6), is formed in the surface of the cylindrical sections 26, 28.

In the embodiment of the pin 18 ("add-on shaft pin") of the add-on shaft 16 proposed here and illustrated by way of example in FIG. 9 the pin 18 is subdivided into four sections, namely a first section 30 having the length l1 (entry guide), a second section 32 having the length l2, a third section 34 having the length l3 and a fourth section 36 having the length l4. The previously (FIG. 8) continuous cylindrical section 26 having the length l is replaced by the second, the third and the fourth section 32, 34, 36. The sum of the lengths l2, l3 and l4 corresponds or at least essentially corresponds to the length l of the previously continuous cylindrical section 6.

Figure 10:
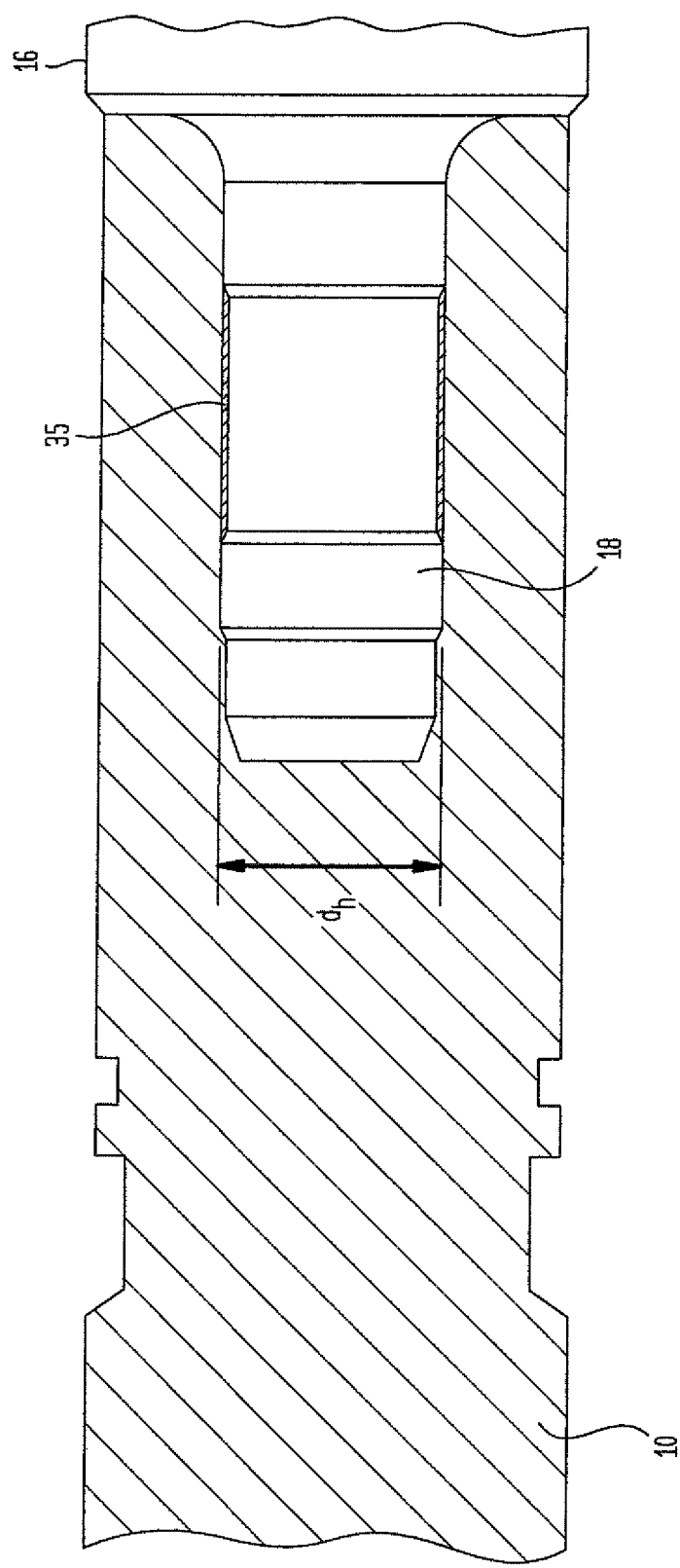
FIG. 10 shows the pin of FIG. 9 with an applied adhesive.

The special feature of the pin 18 consists in the choice and the sequence of the diameters of the four sections 30 to 36. The first, often chamfered section 30 acts as an entry guide and accordingly has smaller diameter $d_1$ compared with the internal diameter $d_h$ of the blind hole 14, in other words for example a diameter with a d9 tolerance (clearance fit), such that the first section 30 can be easily introduced into the blind hole 14. The second and the fourth sections 32, 36 have for example respective diameters $d_2$ and $d_4$ with an m6 tolerance and thereby act as seats for the pin 18 introduced into the blind hole 14 and bring about a slight interference fit with the blind hole 14 with an H7 tolerance. The two seats (second section 32, fourth section 36) spaced apart from one another ensure a high degree of accuracy in the axial alignment of the add-on shaft 16 with the motor shaft 10 and as a result the high degree of concentricity achieved of the add on shaft 16. The surfaces of the two seats (second section 32, fourth section 36) are for example ground or turned. The diameter $d_3$ of the third section 34 is smaller than the diameters $d_2$ and $d_4$ of the second and fourth sections 32, 36. A diameter with a d9 tolerance comes into consideration here for example. An adhesive 35 or the like, as shown in more detail in FIG. 10, is applied at least in the third region 34, optionally also on all the other sections 30, 32 and 36, in particular on all the other sections 30 to 36 as well as in the blind hole 14 itself, in order to fix the pin 18 in the blind hole 14. The second section 32 with its greater diameter located before the third section 34 in the entry direction of the pin 18 into the blind hole 14 has the effect that the adhesive applied in the third section 34 is not wiped off when the pin 18 is introduced into the blind hole 14. As shown in FIG. 9, one or more venting grooves 20, similar to those shown in FIGS. 3-6, are formed in the surface of the pin in the region from the first cylindrical section to the fourth cylindrical section (omitted in FIG. 10 for sake of clarity) to allow the air to escape upon introduction of the add-on shaft into the blind hole.

The advantages of the approach described here can be summarized as follows: A significant increase in the stability of the adhesive bond is achieved by the region with a reduced diameter (third section 34) between the two seats (second section 32, fourth section 36) or the regions with a reduced diameter (first and third sections 30, 34) abutting against the two seats. A defined adhesive gap width optimized to the respective adhesive is provided there through a suitable choice of the respective diameter. Because at least the adhesive in the third section 34 is quasi shielded during the preceding introduction/joining operation by the section having a greater diameter (second section 32), this ensures that the adhesive in the third section 34 is not wiped off during the introduction/joining operation. A suitable choice for the length of the third section 34 or the length of the first and third sections 30, 34 results in an optimum size of the contact area provided with adhesive. A suitable choice for the surface structure in the third section 34 or in the first and third sections 0, 34 results in optimum wetting by the adhesive and a likewise optimum adhesion of the adhesive. A turned surface comes into consideration in this respect, for example. The roughness resulting in this situation brings about such a wetting and adhesion. The add-on shaft 16 is effectively prevented by the interference fits effected by means of the second and fourth sections 32, 36 from "drifting" by being pressed out while the adhesive is curing. Said interference fits produce a coaxial seat free from play for the add-on shaft 16 in the blind hole 14 of the receiving shaft, for example a motor shaft 10, prevent any misalignment of the add-on shaft 16 and ensure a high degree of concentricity of the add-on shaft 16. Furthermore, the joining, in other words the introduction of the pin 18 into said blind hole 14, takes place with minimal force which means that bending of the add-on shaft 16 is avoided. As a result there is potentially no need whatsoever to perform an alignment of the add-on shaft 16 after installation and the combination with the respective shaft, in particular a motor shaft 10 of an electric motor 12, can also be considered for applications making high demands on the concentricity of the mounted add-on shaft 6.

Although the invention has been illustrated and described in detail by means of the exemplary embodiment, the invention is not restricted by the disclosed example or examples and other variations can be derived therefrom by the person skilled in the art without departing from the scope of protection of the invention.

What is claimed is:

1. An add-on shaft for operatively connecting a rotary encoder to an electric motor having a motor shaft with a centered blind hole, said add-on shaft having a proximate end being configured as a pin to be fixed in the blind hole and a distal add-on shaft extension, said pin comprising, as seen from the proximate end of the pin:
   a first cylindrical section, said first cylindrical section having a first diameter;
   a second cylindrical section adjacent the first cylindrical section, said second cylindrical section having a second diameter;
   a third cylindrical section adjacent the second cylindrical section, said third cylindrical section having a third diameter,
   a fourth cylindrical section adjacent the third cylindrical section, said fourth cylindrical section having a fourth diameter, the second and the fourth diameters being equal in size, the first and the third diameters being smaller than the second and fourth diameters, wherein the second and the fourth diameters are dimensioned to provide an interference fit in the blind hole,
   wherein a surface of the pin in at least a region of the third cylindrical section is rougher than a surface in a region of the second and fourth cylindrical sections, and
   wherein the distal add-on shaft extension is configured to be attached to a rotary encoder, said pin being configured to be introduced into the blind hole section-by-section starting with a first section, and to be fixed in the blind hole of the motor shaft to prevent rotation between the add-on shaft and the motor shaft by an adhesive applied to a surface of the add-on shaft, at least in a region of the third cylindrical section.

2. The add-on shaft of claim 1, wherein a surface of the pin in a region of the second and fourth cylindrical section is ground or turned.

3. The add-on shaft of claim 1, wherein the pin comprises at least one helical venting groove in a region from the first cylindrical section to the fourth cylindrical section.

4. An electric motor comprising:
a rotary motor shaft having a centered blind hole with an inside diameter; and
an add-on shaft having a proximal end with a pin affixed in the centered blind hole, said add-on shaft having a distal end distal from the proximal end and being configured to operatively connect a rotary encoder to the electric motor, said pin including:
a first cylindrical section located proximate to the proximal end of the add-on shaft and disposed farthest inside the blind hole, said first cylindrical section having a first diameter;
a second cylindrical section adjacent the first cylindrical section, said second cylindrical section having a second diameter;
a third cylindrical section adjacent the second cylindrical section, said third cylindrical section having a third diameter; and
a fourth cylindrical section adjacent the third cylindrical section, said fourth cylindrical section having a fourth diameter, the second and the fourth diameters being equal in size and being dimensioned to provide an interference fit between an inside of the blind hole and the second cylindrical section and the fourth cylindrical section, respectively, the first and the third diameters being smaller than the second and fourth diameters,
and an adhesive disposed on a surface of the pin, at least in a region of the third cylindrical section, said adhesive forming after curing a permanent bond between the rotary motor shaft and the add-on shaft to prevent rotation between the add-on shaft and the motor shaft.

5. The electric motor of claim 4, further comprising:
a rotary encoder operatively connected to the distal end of the add-on shaft so as to be driven by the add-on shaft.

6. The electric motor of claim 4, wherein a surface of the pin in a region of the second and fourth cylindrical section is ground or turned.

7. The electric motor of claim 4, wherein a surface of the pin in at least a region of the third cylindrical section is rougher than a surface in a region of the second and fourth cylindrical sections.

8. The electric motor of claim 4, wherein the pin comprises at least one helical venting groove in a region from the first cylindrical section to the fourth cylindrical section.

9. A method for driving a rotary encoder of an electric motor, comprising:
providing an add-on shaft which comprises a proximate end formed as a pin and a distal add-on shaft extension, said pin having a first cylindrical section having a first diameter; a second cylindrical section adjacent the first cylindrical section, said second cylindrical section having a second diameter, a third cylindrical section adjacent the second cylindrical section, said third cylindrical section having a third diameter; and a fourth cylindrical section adjacent the third cylindrical section, said fourth cylindrical section having a fourth diameter, the second and the fourth diameters being equal in size, the first and the third diameters being smaller than the second and fourth diameters;
aligning the add-on shaft in a centered blind hole of a motor shaft of the electric motor with an interference fit between the second cylindrical section and the fourth cylindrical section, respectively, and an inner surface of the centered blind hole and fixing the add-on shaft in the centered blind hole with an adhesive disposed at least in a region of the third cylindrical section, said adhesive forming after curing a permanent bond between the rotary motor shaft and the add-on shaft and preventing rotation between the add-on shaft and the motor shaft;
operatively connecting the distal add-on shaft extension with a rotary encoder of the electric motor; and
driving the rotary encoder via the add-on shaft.

10. A method for connecting an add-on shaft to a motor shaft of an electric motor, the motor shaft having a centered blind hole, the add-on shaft having a pin with first, second, third and fourth cylindrical sections and an add-on shaft extension adjacent to the fourth cylindrical section, said add-on shaft extension being configured to be attached to a rotary encoder, comprising:
applying an adhesive to a surface of the pin, at least in a region of the third cylindrical section;
introducing the pin, with the first cylindrical section of the pin leading, into the centered blind hole in the motor shaft, the second and the fourth diameters being equal in size, the first and the third diameters being smaller than the second and fourth diameters;
aligning the add-on shaft in the blind hole by means of an interference fit between the second and the fourth sections of the pin and the blind hole; and
curing the adhesive applied at least in the region of the third section in the interior of the blind hole so as to bond the add-on shaft with the interior surface of the blind hole.

* * * * *